Aug. 9, 1966 H. E. HELMS ETAL 3,265,314
HEAT DISPERSING SWIVEL ROCKET NOZZLE LINER
Filed Sept. 13, 1963
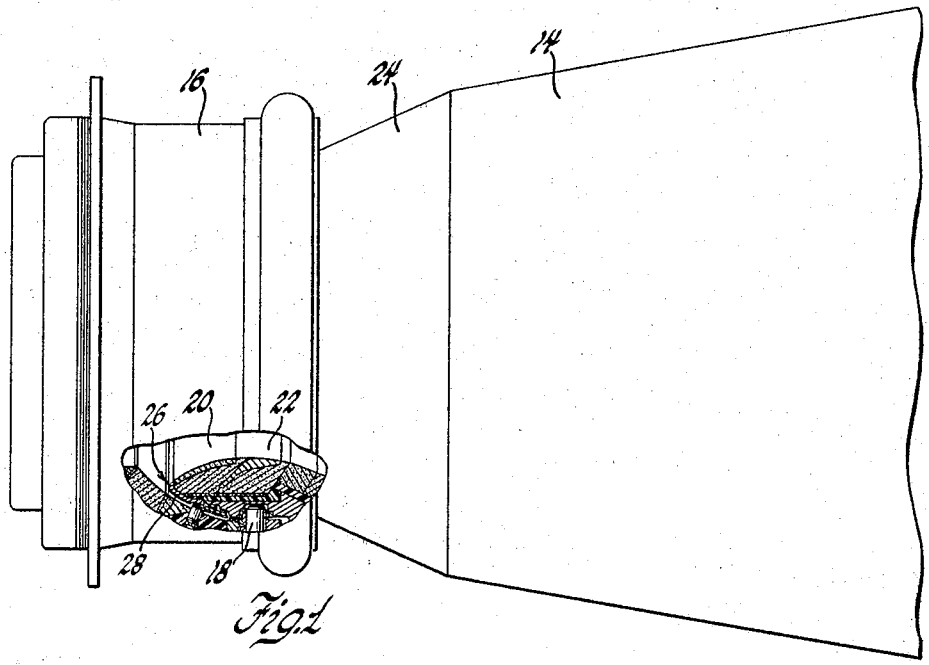
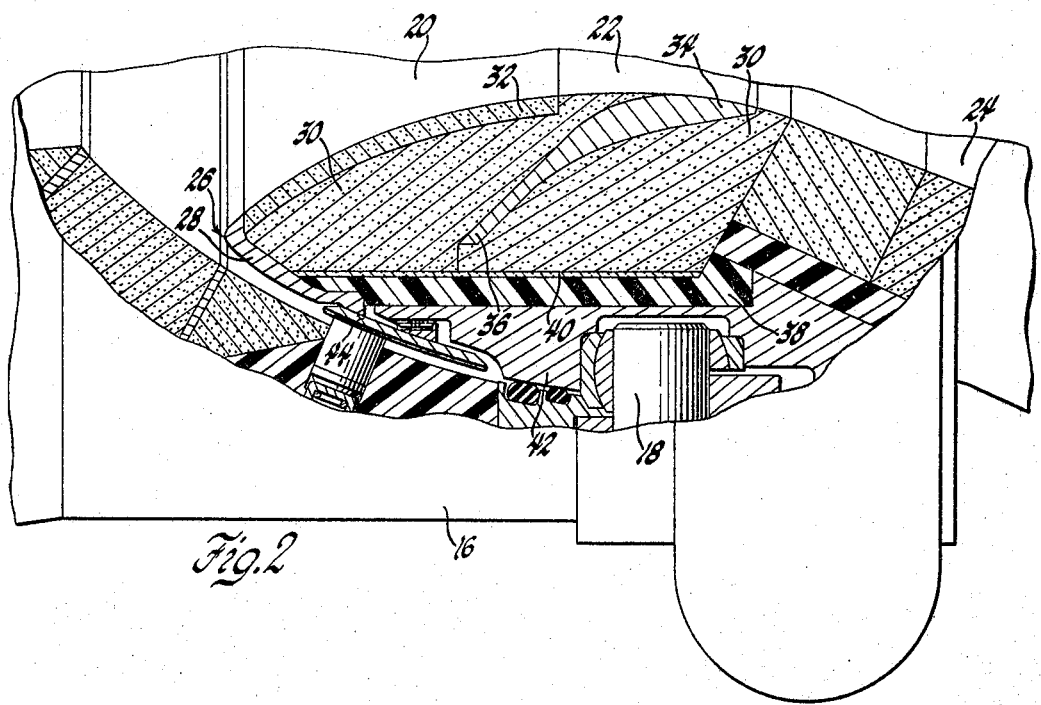
INVENTORS
Harold E. Helms,
Kenneth O. Johnson, &
James A. Pyne
Paul Fitzpatrick
ATTORNEY though the heat shield is subjected to extreme heat it does not fail because of the controlled manner in which the heat is absorbed and dispersed therein.

United States Patent Office
3,265,314
Patented August 9, 1966

3,265,314
HEAT DISPERSING SWIVEL ROCKET NOZZLE LINER
Harold E. Helms, Indianapolis, Kenneth O. Johnson, Camby, and James A. Pyne, Indianapolis, Ind., assignors to General Motors Corporation, Detroit, Mich., a corporation of Delaware
Filed Sept. 13, 1963, Ser. No. 308,906
1 Claim. (Cl. 239—591)

This invention relates to rocket nozzles using a new principle of heat sink structure and, more particularly, to a nozzle liner system which results in an effective heat sink for a longer period of time than results from the conventional heat sink design.

Several problems have arisen in present day rocket engine nozzles with respect to failure of the nozzle structure when subjected to extremely high temperatures. For the heat sink nozzle design, heat is conducted radially outward, from the hotter heat transfer surface, into the cooler heat sink material. The nozzle heat transfer surface temperature increases very rapidly with time to a very high value and then increases more slowly, gradually approaching the gas temperature, as the firing cycle progresses. The rest of the heat sink material behaves in a similar fashion but with a different time rate which depends upon the distance away from the heat transfer surface, the type of heat sink material or materials and their arrangement. This results in large thermal stresses, localized cracking, and failure. As the surface temperature increases, the surface layers of the heat sink material become weak and disappear due to erosion and phase change. If the heat sink were effective for a longer period of time, these phenomena would not occur until later in the firing cycle, ideally, they would occur just at the end of the firing cycle. Thus, it has become apparent that a nozzle liner system is needed which will prolong the effectiveness of the heat sink, thereby reducing the possibility of erosion and failure of the nozzle.

Therefore, it is an object of this invention to provide a nozzle liner system for heat sink nozzles which will prolong the usefulness of the heat sink. This will produce lower temperatures in the wall at a given time and thus reduce the detrimental effects due to high temperature. These detrimental effects include but are not limited to localized cracking, erosion and burn-out.

Other objects, features and advantages of the invention will become readily apparent upon reference to the succeeding detailed description and the drawings illustrating the preferred embodiment thereof; within, FIGURE 1 is a schematic view of the rocket engine showing the nozzle liner system in section; and FIGURE 2 is an enlarged view of the nozzle liner system of FIGURE 1.

In general, then, the invention relates to a nozzle liner system which provides a heat flow path which is not purely radial and which produces beneficial effects. This heat flow path is provided by a combination of several liner components which will be described.

More particularly, FIGURE 1 shows a rocket engine exhaust nozzle 14. It is of the vectoring type and may rotate within the nozzle inlet housing 16. This vectoring action is provided by having the nozzle 14 pivot on pin members 18, which are attached to the housing 16. The nozzle 14 is of the converging-diverging type having a converging inlet portion 20, a throat or venturi portion 22, and a diverging exit cone 24. The invention is applied herein to a vectoring nozzle; however, it is readily recognized that it is not limited to a vectoring type of nozzle.

The nozzle liner system is shown in detail in FIGURE 2. The nose portion 26 of the nozzle 14 has a tungsten liner 28. This liner wraps around the nose and extends around the exterior of the main nozzle liner. The main body of the liner system is composed of carbon rings 30 of normal graphite material. The surface of the converging portion 20 of the nozzle 14 has a pyrolytic graphite liner 32. The throat section 22 of the nozzle 14 is lined with another tungsten liner 34. This tungsten liner 34 has a conical flange 36 which extends between the carbon rings 30. The carbon rings 30 are backed up by the normal plastic substance 38. The remaining liner members of the nozzle will be of structural material such as tantalum, titanium and zirconia. The zirconia forms a thin layer 40 between the carbon block 30 and the plastic substance 38. The titanium provides a backing structure 42 for the plastic substance 38 and the tantalum comprises the bearing surface 44 upon which the nozzle structure slides when vectoring.

The pyrolytic graphite liner 32 used in the converging portion 20 of the exhaust nozzle 14 has heat conduction properties which make it very useful in this portion. Pyrolytic graphite is known to have very high heat conducting properties along one axis while having very low heat conducting properties perpendicular to this axis. Therefore, with the proper orientation of the grain structure of the pyrolytic graphite the flow of heat can be restricted to a desired direction. The use, then, of this pyrolytic graphite liner 32 in combination with the tungsten liner 34 and the graphite rings 30 provides the liner system previously mentioned. The converging portion 20 of the nozzle liner normally has been carbon rings with isotropic thermal properties which conduct heat radially and axially equally well. The thermal stress generated by the thermal gradient in the graphite has caused cracking which at times was severe enough to result in the loss of chunks of material which was followed by localized burnout and catastrophic failure. The pyrolytic graphite liner 32 is chosen such that its good heat conducting direction is parallel to the flow of hot gases and its poor heat conducting direction is normal to the flow of hot gases, thereby restricting the radial inward flow of heat in this area. Therefore, as the hot gas contacts the pyrolytic graphite liner 32 it increases in temperature but only a small portion of the heat flows through this liner 32 to the normal graphite 30 behind it. Thus, the orientation of the pyrolytic graphite 32 results in a heat shield which prolongs the usefulness of the heat sink 30. The tungsten insert 34 extends into the cool carbon rings 30 and heat is conducted down the tungsten insert and its radial extension 36 and dispersed in the carbon rings 30. This reduces the rate of temperature increase of the nozzle heat sink and makes the radial temperature distribution in the graphite rings more uniform, thus reducing the thermal stresses in these rings.

Analysis has shown that the surface temperature of the throat section 22 has been reduced from 4800° F. to 4035° F. at the end of sixty seconds when the subject nozzle system is used in place of a normal carbon nozzle liner. This reduction is very important when it is realized that the tungsten forms an alloy with the carbon which melts at 4600° F. Since the throat section 22 is the most critical area for determining the resultant thrust of the rocket engine, it is highly desirable that this area remain intact as long as possible. Therefore, the reduction of the temperature of this area by the subject nozzle liner system insures a longer life for this portion, and thereby enables the rocket engine to produce maximum thrust for a correspondingly longer period of time.

In summary then, it is seen that the subject nozzle liner system provides an effective method of controlling the rate of heat flow through the nozzle liner of a rocket engine and it further controls the heat flow such that the nozzle liner will be less susceptible to thermal shock and associated cracking. The ultimate result of this is that the throat portion of the nozzle liner remains intact for a longer period of time at the same gas temperature or, for the same period of time, at a higher gas temperature.

Although the subject invention has been illustrated with respect to a nozzle liner of an exhaust nozzle of a rocket engine, it will be clear to those skilled in the art to which the invention pertains that the subject invention will have many applications other than that which is disclosed in which a heat flow path controlling liner system is desired, and that many modifications and changes may be made thereto without departing from the scope of the invention.

We claim:

A rocket engine vectoring exhaust nozzle having a nose portion, a converging portion, a throat portion, and a heat flow path controlling liner system comprising, in combination, a carbon mass forming the larger portion of the nozzle structure, a tungsten liner at the nose portion of the nozzle, a pyrolytic graphite liner shielding the converging portion of the nozzle, said pyrolytic graphite liner portion having its one-dimensional heat conduction characteristics oriented to cause the heat to flow along the nozzle surface, parallel to the flow of gases through the nozzle, thereby restricting radial heat flow, a tungsten liner exposed at the throat portion of the nozzle having a portion extending radially and toward the nose portion through said carbon mass externally of and spaced from the pyrolytic graphite liner, both said tungsten liners providing paths to conduct the heat to interior points in the carbon mass, the combination of said liners providing a heat flow path to favorably control the heating rate throughout the carbon mass thereby reducing the possibility of thermal shock and local failures.

References Cited by the Examiner
UNITED STATES PATENTS

| | | | |
|---|---|---|---|
| 2,849,860 | 9/1958 | Lowe | 60—35.6 |
| 3,106,061 | 10/1963 | Eder | 60—35.55 |
| 3,115,746 | 12/1963 | Hsia | 60—35.6 |
| 3,137,132 | 6/1964 | Turkat | 60—35.6 |
| 3,156,091 | 11/1964 | Kraus | 60—35.6 |
| 3,165,888 | 1/1965 | Keon | 60—35.6 |

FOREIGN PATENTS 1,246,339  10/1960  France.

OTHER REFERENCES

Rocket Refractories by Porter, Navord Report 4893, Nots. 1191, August 1955, pp. 9–12 relied on.

MARK NEWMAN, *Primary Examiner*.

CARLTON R. CROYLE, *Examiner*.